(No Model.)
W. LOUDEN.
HAY ELEVATOR.
No. 498,666. Patented May 30, 1893.
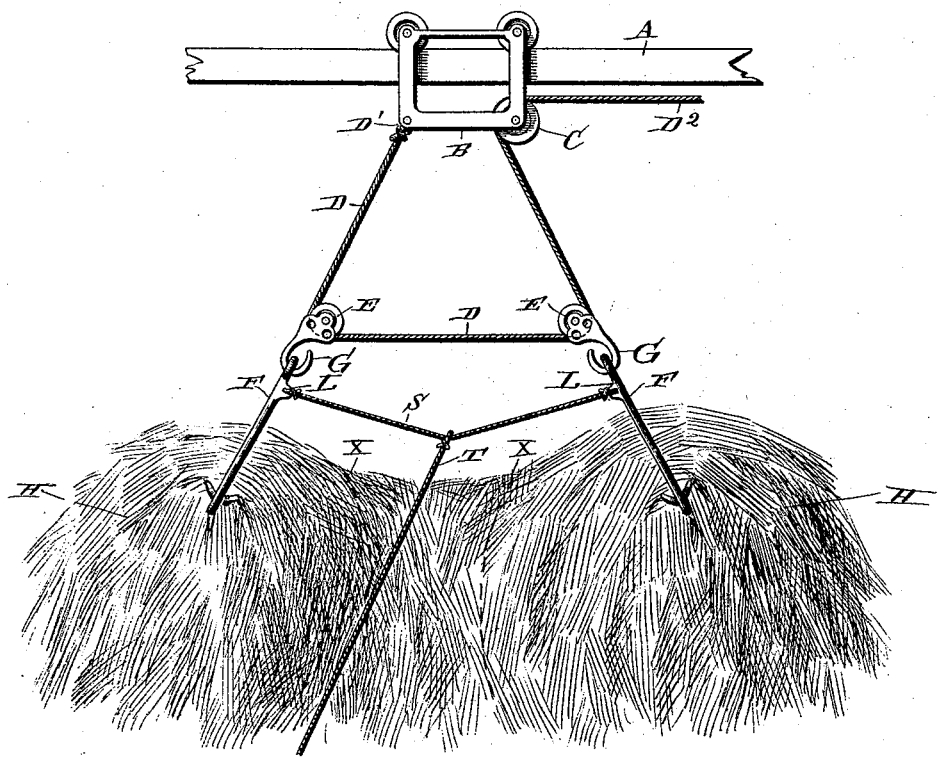
Witnesses:
W. H. Bloss
Lizzie C. Louden
Inventor:
William Louden

UNITED STATES PATENT OFFICE.

WILLIAM LOUDEN, OF FAIRFIELD, IOWA.

HAY-ELEVATOR.

SPECIFICATION forming part of Letters Patent No. 498,666, dated May 30, 1893.

Application filed December 12, 1892. Serial No. 454,952. (No model.)

*To all whom it may concern:*

Be it known that I, WILLIAM LOUDEN, a citizen of the United States, residing at Fairfield, in the county of Jefferson and State of Iowa, have invented certain new and useful Improvements in Hay-Elevators; and I do hereby declare the following to be a full, clear, and exact description of the invention, such as will enable others skilled in the art to which it pertains to make and use the same.

The invention relates to a novel combination of two hay elevating forks with a hoisting tackle, and consists of a hoisting rope upon which two pulley blocks each provided with hooks are mounted, and to each of which blocks a hay elevating fork is connected by means of the hooks, so that when the forks are set in the hay near opposite ends of the load, the hay in the center of the load will be held together by the lateral pressure of the forks, which prevents the hay from dropping out as it would be liable to do if the forks were rigged in the ordinary way.

The figure is a side elevation of the invention showing it rigged to an ordinary hay carrier B. running on an elevated track A. The carrier is provided with a rope wheel or sheave C. upon which a hoisting rope D. is mounted. Upon the rope D. are also mounted two pulley blocks E. E. having hooks G. G. and the end D'. is connected to the carrier in any suitable manner. Hay lifting forks F. F., of any suitable construction are connected to the pulley blocks E. E. as shown in the drawing. The trip lever L of each fork is connected to a rope or cord S. and to this connecting rope S. the ordinary trip cord T. is secured, so that a pull on the trip cord will serve to discharge the hay from both forks simultaneously.

The details of the fork discharging devices are not herein shown, because they form no part of the invention herein set forth, and because there are a number of said devices in common use, and well known to those skilled in the art which will answer the purpose herein contemplated.

H. H. represent the load of hay being elevated.

The operation is as follows: The forks, being drawn down to the load of hay in the ordinary way, are spread apart, one fork being set in one end of the load and the other fork in the opposite end of the load. Power being applied to the end D². of the hoisting rope, the forks will be elevated with their respective loads of hay, and will also be drawn together by the compression of the hoisting rope upon the pulleys E. E. and that part of the load between the dotted lines *x. x.* which would ordinarily fall off will be securely held between the forks and be safely carried into the mow or on to the stack where the hay is to be deposited, when a pull of the trip cord T. discharges the load. By this means very large loads of hay may be elevated at each draft and the litterings so common to hay elevating forks used in the ordinary way will be largely prevented. Any kind of a carrier may be used, or the carrier may be dispensed with and an ordinary pulley block may be used instead to mount the rope D. upon, and the end D'. may be secured to any suitable sustaining device. A good plan is to use the forks F. F. to take off the top of the wagon load of hay, and then clean up the bottom of the load with a hay sling which has been laid upon the rack before the load is built upon it. The forks being removably connected to the pulley blocks E. E., can be easily and quickly taken off and the sling hooked on in their place; or in case it is desired to use only one fork, the other one is easily removed and the remaining fork may be readily rigged to work in the ordinary way.

The elevating power may be applied in any suitable manner to either or both ends of the hoisting rope D. and a double rope rigged to work on double pulleys in place of the single ones E. E. may be used without departing from the spirit and scope of my invention.

Having fully described my invention, what I claim as new, and desire to secure by Letters Patent, is—

1. The combination of a hoisting rope having one end passed over an elevated pulley and the other end secured to an adjacent support, two pulley blocks hung in the loop of the hoisting rope, and two separate hay lifting forks detachably connected to the pulley blocks, substantially as, and for the purpose set forth.

2. The combination of a hoisting rope having one end passed over an elevated pulley and the other end secured to an adjacent support, two pulley blocks hung in the loop of the hoisting rope, two separate hay lifting forks detachably connected to the pulley blocks, and a trip cord connected to both forks to discharge them from the hay simultaneously, substantially as set forth.

3. The combination of a hay carrier mounted upon an elevated track, a hoisting rope connected to the carrier so as to form a loop, two pulley blocks hung in the loop of the hoisting rope, and two separate hay lifting forks detachably connected to the pulley blocks, substantially as and for the purpose set forth.

4. The combination of a hay carrier mounted upon an elevated track, a hoisting rope connected to the carrier so as to form a loop, two pulley blocks hung in the loop of the hoisting rope, two separate hay lifting forks detachably connected to the pulley blocks and a trip cord connected to both forks to discharge them from the hay simultaneously, substantially as set forth.

5. The combination and arrangement of the hoisting rope D. pulley blocks E. E., forks F. F., connecting rope S. and trip cord T. substantially as shown and described.

6. The combination and arrangement of the carrier B, hoisting rope D, pulley blocks E. E., forks F. F. connecting rope S and trip cord T substantially as shown and described.

In testimony whereof I have signed this specification in the presence of two subscribing witnesses.

WILLIAM LOUDEN.

Witnesses:
 THOS. E. V. FARISS,
 WM. S. COOK, Jr.